H. C. DALEY & A. A. TAYNOR.
SPOT LIGHT ATTACHMENT.
APPLICATION FILED DEC. 12, 1913.

1,101,414.

Patented June 23, 1914.
2 SHEETS—SHEET 1.

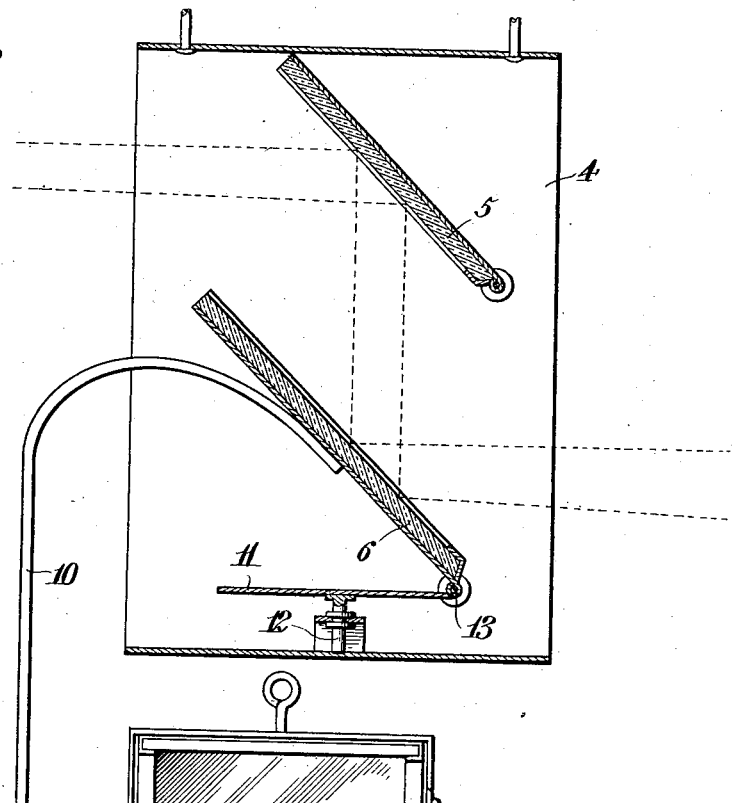
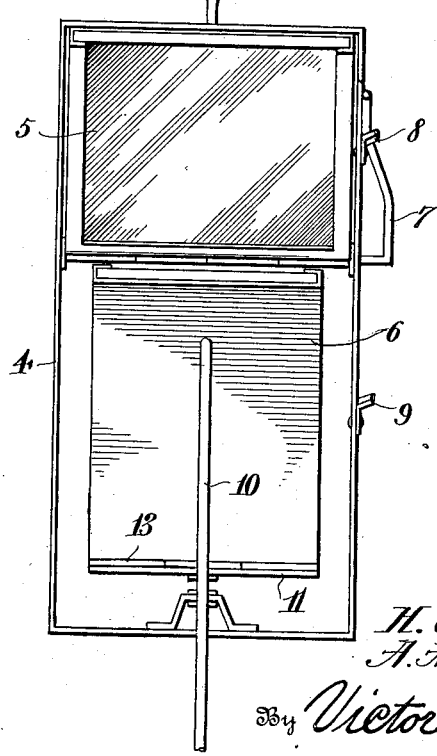

UNITED STATES PATENT OFFICE.

HARRY C. DALEY AND ALBERT A. TAYNOR, OF CARLINVILLE, ILLINOIS.

SPOT-LIGHT ATTACHMENT.

1,101,414. Specification of Letters Patent. Patented June 23, 1914.

Application filed December 12, 1913. Serial No. 806,291.

*To all whom it may concern:*

Be it known that we, HARRY C. DALEY and ALBERT A. TAYNOR, citizens of the United States, residing at Carlinville, in the county of Macoupin and State of Illinois, have invented new and useful Improvements in Spot-Light Attachments, of which the following is a specification.

The primary object of the invention is the provision of means whereby moving picture mechanism, stereopticon and the like may be utilized in the capacity of a spot light thereby overcoming the necessity for providing a spot light apparatus and the cost incident to the purchase and maintenance of such spot light mechanism.

The invention provides an attachment which may be readily applied to and used in connection with moving picture apparatus, stereopticons, magic lanterns and the like, whereby the same may be used in the capacity and for the same purpose as the ordinary spot light to enable the performer or other object to be illuminated to the exclusion of the surroundings.

The invention provides an attachment of the nature and for the purpose specified which will not interfere with the ordinary use of the moving picture apparatus, stereopticon or the like and which may be instantly brought into service for projecting a spot light to any point upon a moving object, the attachment being such as to enable the spot light to follow a moving object in any direction in precisely the same manner as the usual spot light specially designed for such purpose.

The invention consists of the novel features, details of construction and combination of parts, which hereinafter will be more particularly set forth, illustrated in the accompanying drawings, and pointed out in the appended claims.

Figure 1:
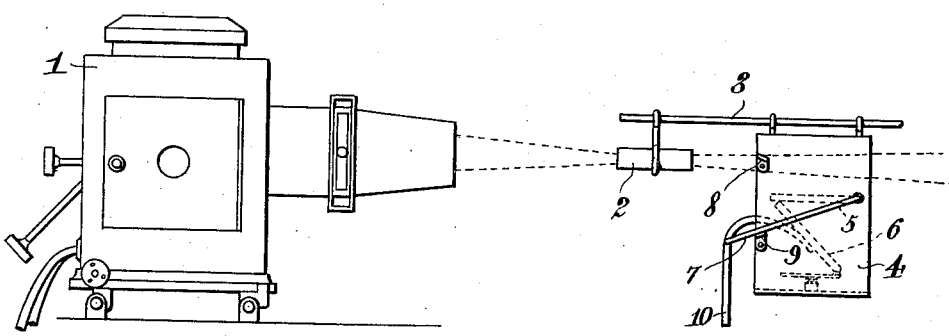
Figure 2:
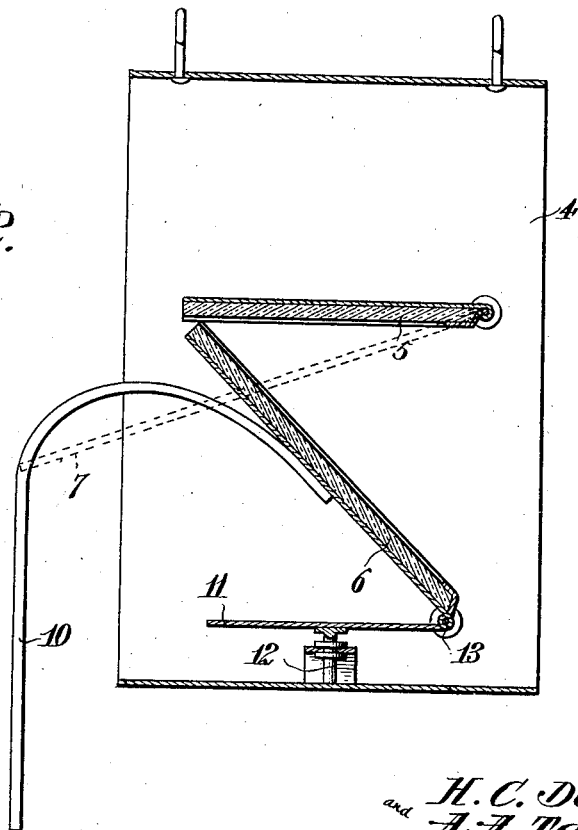

Referring to the drawings, forming a part of the specification, Figure 1 is a side view of a spot light attachment embodying the invention showing the same in connection with an ordinary moving picture apparatus. Fig. 2 is a detail view showing the attachment with the primary reflector moved to such a position as not to deflect the rays of light. Fig. 3 is a view similar to Fig. 2 showing the primary reflector moved to throw the rays of light upon the secondary reflector by means of which the light beams are projected to throw the spot of light upon the object to be illuminated. Fig. 4 is a detail view of the attachment.

Corresponding and like parts are referred to in the following description, and indicated in all the views of the drawings, by the same reference characters.

The numeral 1 designates the lamp house of a moving picture apparatus such as in general use.

The numeral 2 indicates the usual stereopticon lens and 3 the ordinary supporting rod therefor. Inasmuch as the attachment is designed chiefly for use in connection with moving picture apparatus it is illustrated in this connection in the accompanying drawings but it is to be understood that it may be applied to any picture projecting apparatus such as stereopticons and magic lanterns, the attachment being located in front of the usual stereopticon lens to admit of controlling the rays of light to such an extent as to enable the operator to cause the spot to follow a moving object.

The attachment comprises a frame 4 which is in the nature of a housing or casing. Two reflectors or mirrors 5 and 6 are located within the frame 4, the numeral 5 designating the primary reflector or mirror and the numeral 6 the secondary reflector or mirror. The purpose of the primary reflector or mirror 5 is to deflect the rays of light and throw the same upon the secondary reflector or mirror 6. When the picture projecting apparatus is to be used in the ordinary way the reflector or mirror 5 is moved to a position so as not to obstruct the rays of light which are projected in a straight line from the stereopticon lens or like part to the screen. This is indicated most clearly in Fig. 2. When the attachment is required for use to enable the beam of light from the moving picture apparatus to be controlled so as to follow a moving object the mirror 5 is moved to such an angle as to intercept the beam of light and throw the same upon the reflector 6, the latter being under control of the operator so as to throw the spot of light upon the moving object in substantially the same manner as the light of an ordinary spot light mechanism. The reflector 5 is pivotally mounted so as to be moved into or out of the path of the rays of light projected from the picture mechanism. The reflector or mirror 6 is mounted to turn freely about both a vertical and a horizontal axis, such reflector being under the control of the operator to enable the beam of light to be thrown so as to keep a moving object in the light spot in substantially the same manner as the ordinary light machine. A handle 7 is connected with the mirror 5 and is adapted to engage either one of two stops 8 or 9 to hold the reflector 5 in the path of the beam of light or out of such path so as not to intercept the rays of light. A handle 10 is connected with the reflector or mirror 6 and enables such mirror to be turned about a vertical and a horizontal axis. A turn table 11 is mounted to turn about a vertical axis 12 and the reflector or mirror 6 is pivoted thereto at 13 to turn about a horizontal axis. The handle 10 has direct connection with the mirror or reflector 6 thereby enabling the same to be turned about either the horizontal axis 13 or the vertical axis 12 whereby the spot light is caused to follow the moving object in a manner well understood.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claims appended hereto.

Having thus described the invention what we claim as new is:—

1. A spot light attachment for picture projecting apparatus, the same comprising a primary reflector pivotally mounted to be thrown into or out of the path of the beam of light projected by means of the picture apparatus and a second reflector arranged to receive the beam of light deflected by the primary reflector and mounted to turn about a vertical and a horizontal axis to admit of the deflected beam of light to be thrown so as to follow a moving object.

2. A spot light attachment for picture projecting apparatus, the same comprising a frame, a primary reflector located within such frame and pivotally mounted so as to occupy a position either to clear the beam of light projected from the picture apparatus or to intercept such beam of light, means for holding the primary reflector in the adjusted position and a second reflector mounted within the frame to turn about a vertical and a horizontal axis and under control of the operator to enable the beam of light deflected by the primary reflector to be projected to follow a moving object.

In testimony whereof we affix our signatures in presence of two witnesses.

HARRY C. DALEY.
ALBERT A. TAYNOR.

Witnesses:
HELEN A. DAVID,
C. G. HEINZ.